US008467817B2

(12) United States Patent
Said et al.

(10) Patent No.: US 8,467,817 B2
(45) Date of Patent: Jun. 18, 2013

(54) GENERIC BUSINESS NOTIFICATIONS FOR MOBILE DEVICES

(75) Inventors: Bare Said, St. Leon-Rot (DE); Peter Eberlein, Malsch (DE)

(73) Assignee: SAP AG, Walldorf (DE)

( * ) Notice: Subject to any disclaimer, the term of this patent is extended or adjusted under 35 U.S.C. 154(b) by 91 days.

(21) Appl. No.: 13/162,442

(22) Filed: Jun. 16, 2011

(65) Prior Publication Data

US 2012/0322470 A1 Dec. 20, 2012

(51) Int. Cl.
*H04W 88/02* (2009.01)

(52) U.S. Cl.
USPC ........................................................ 455/466

(58) Field of Classification Search
USPC ..................... 455/466, 567; 709/206; 705/14, 705/17, 35
See application file for complete search history.

(56) References Cited

U.S. PATENT DOCUMENTS

| | | | |
|---|---|---|---|
| 7,657,575 B2 | 2/2010 | Eberlein et al. | |
| 7,702,650 B2 | 4/2010 | Brunswig et al. | |
| 7,711,620 B2 * | 5/2010 | Abifaker | 705/35 |
| 7,720,992 B2 | 5/2010 | Brendle et al. | |
| 7,725,907 B2 | 5/2010 | Bloching et al. | |
| 7,730,412 B2 | 6/2010 | Said | |
| 7,734,648 B2 | 6/2010 | Eberlein | |
| 7,739,387 B2 | 6/2010 | Eberlein et al. | |
| 7,877,695 B2 | 1/2011 | Brunswig et al. | |
| 7,900,190 B2 | 3/2011 | Brunswig et al. | |
| 8,290,542 B2 * | 10/2012 | Gosselin | 455/567 |
| 2007/0239800 A1 | 10/2007 | Eberlein | |
| 2008/0005623 A1 | 1/2008 | Said | |
| 2008/0052164 A1 * | 2/2008 | Abifaker | 705/14 |
| 2008/0288960 A1 | 11/2008 | Eberlein et al. | |
| 2009/0144721 A1 | 6/2009 | Wagner et al. | |
| 2009/0264102 A1 * | 10/2009 | Parmar et al. | 455/411 |
| 2010/0228788 A1 | 9/2010 | Eberlein | |
| 2011/0279459 A1 * | 11/2011 | Hohpe | 345/467 |
| 2012/0233004 A1 * | 9/2012 | Bercaw | 705/17 |
| 2012/0254325 A1 * | 10/2012 | Majeti et al. | 709/206 |

OTHER PUBLICATIONS

"Apple Push Notification Service," *Wikipedia*, [online], http://en.wikipedia.org/wiki/Apple_Push_Notification_Service; retrieved Jun. 15, 2001, 1 page.

* cited by examiner

*Primary Examiner* — Diane Mizrahi
(74) *Attorney, Agent, or Firm* — Fish & Richardson P.C.

(57) ABSTRACT

The present disclosure involves systems and computer-implemented methods for providing generic push notifications to mobile devices. One process includes monitoring at least one business process for an occurrence of a triggering event. In response to the occurrence of the triggering event, at least one parameter associated with the particular triggering event is identified. A user associated with the at least one business process and the particular triggering event is identified, and a message for the user is generated, where the generated message identifies a mobile business application associated with the particular triggering event and includes the at least one identified parameter. The generated message can then be sent to a mobile device associated with the user. In some instances, the generated message may be an SMS message, and can include embedded code to allow the mobile device to launch the identified mobile business application.

20 Claims, 9 Drawing Sheets

400

PATTERN:
<task_type>@<application identifier>: <Task description>, <optional for enhanced message: embedded hyperlink for opening relevant mobile business application, with possible parameters defining the state or event associated with the notification>

EXAMPLE:
Approval@Design_Alert: annual leave request for Mr. Heinz Mustermann, http://www.xyz.com?encodedparameter1=abc

FIG. 4A

GENERIC BUSINESS NOTIFICATIONS FOR MOBILE DEVICES

TECHNICAL FIELD

The present disclosure relates to software, computer systems, and computer implemented methods for providing generic push notifications to mobile devices.

BACKGROUND

More and more enterprise business applications are offered for use on mobile devices. Customers expect that enterprise software developers will increasingly provide mobile device versions of the business applications, where the business applications were originally developed as desktop applications with consistent access to backend systems. As additional enterprise software developers have begun to provide mobile applications with increased levels of connectivity to backend, centralized systems storing data associated with business processes and applications.

Push technology generally describes a style of Internet-based communication where the request for a given transaction is initiated by the publisher or central server. It is contrasted with pull technology, where the request for the transmission of information is initiated by the receiver or client. Mobile device technologies, such as Apple's Push Notification Service and Research in Motion's (RIM) Blackberry Enterprise Server push notifications, have been developed to provide push notification availability to a larger segment of mobile device users using Apple or RIM's phones and services.

Notification-based business applications are difficult to realize on mobile devices, as push notification solutions can cause performance loss due to increased resource consumption—processor, battery, and network connectivity usage are required to receive constant push notifications. For many business applications, it is not possible to run an application to connect automatically and regularly to a backend system and to receive and make available on-time business notifications at the mobile device. The push notification systems available today provide special instructions and services to enable specific mobile phones (i.e., Apple's iPhone and RIM's Blackberry products) available for instant notifications. These solutions are device-specific and require services provided by a particular service provider.

SUMMARY

The present disclosure involves systems and computer-implemented methods for providing generic push notifications to mobile devices. One process includes monitoring at least one business process for an occurrence of a triggering event. In response to the occurrence of the triggering event, at least one parameter associated with the particular triggering event is identified. A user associated with the at least one business process and the particular triggering event is identified, and a message for the user is generated, where the generated message identifies a mobile business application associated with the particular triggering event and includes the at least one identified parameter. The generated message can then be sent to a mobile device associated with the user. In some instances, the generated message may be an SMS message, and can include embedded code to allow the mobile device to launch the identified mobile business application.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 4A is an illustration of an example message pattern and an example message used in one implementation.

DETAILED DESCRIPTION

Figure 1:
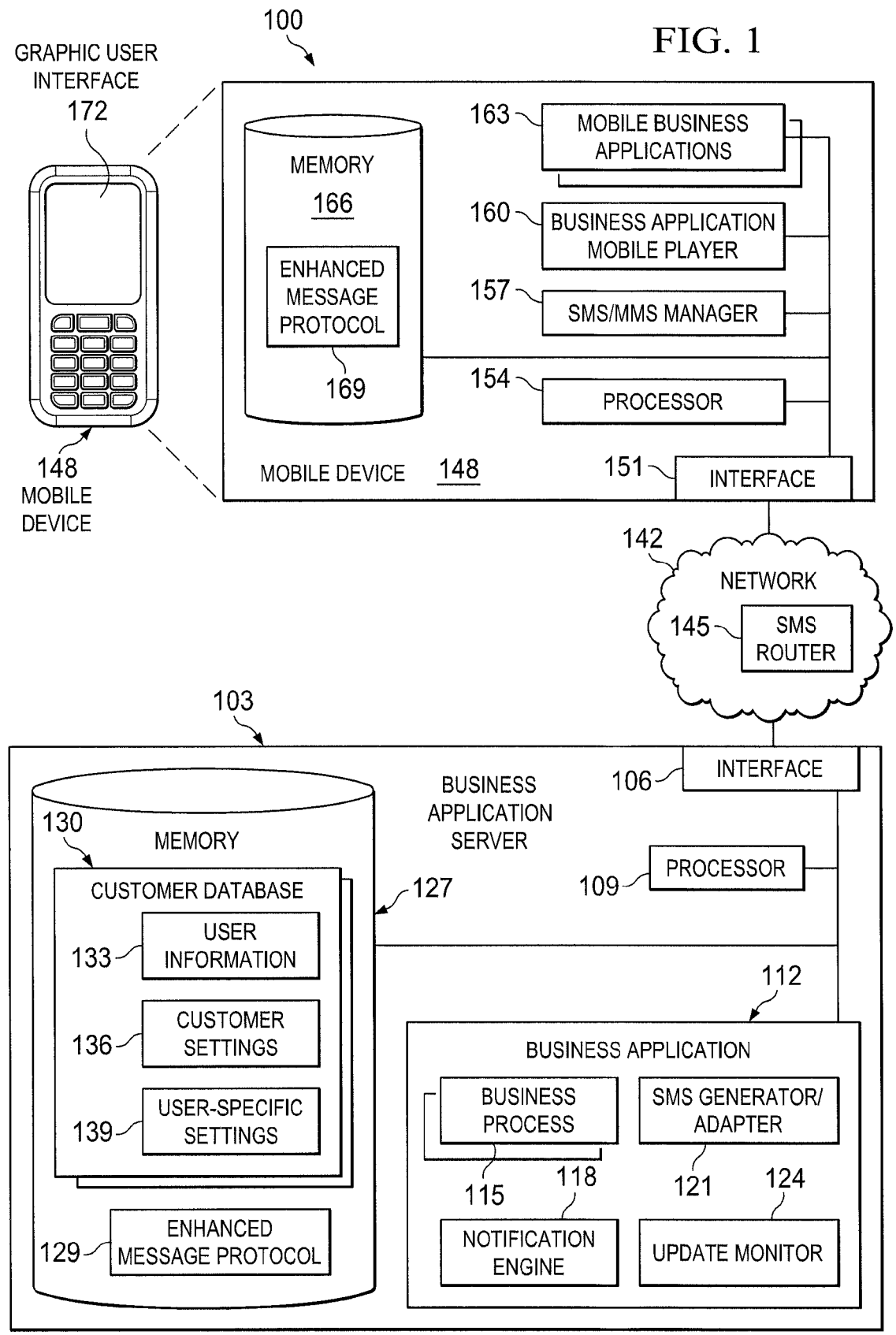
FIG. 1 illustrates an example environment for implementing various features of a system providing generic push notifications to mobile devices.

This disclosure generally relates to software, computer systems, and computer implemented methods for providing generic push notifications on mobile devices. Specifically, tools and methods for providing up-to-date information to notification-centric mobile business applications on mobile devices without the need for proprietary notification systems and without requiring a background process having continuous connection to a backend system are described.

The tools and methods in the present disclosure leverage well-known messaging technologies, such as Short Message Service (SMS), to push succinct and instant notification to mobile devices operable with SMS (and other suitable messaging technologies, such as Multimedia Messaging Service (MMS)). Backend systems executing business applications can be enhanced and enable to send an SMS message to a corresponding business user associated with an event at the backend system. For example, alerts and business tasks can be generated automatically by business applications at the backend system. Prior to the tools described here, messages, alerts, and notifications related to those and other events may be provided to a desktop application constantly connected to the backend system, as well as to a user-specific inbox or other messaging service on the backend system. Previously, users could access the backend system using a client application (such as a web browser) to access and manipulate the information and processes operating on the backend system. Using the described systems and methods, the messages, alerts, and notifications associated with backend system business applications can be, instead of being delivered to the user-specific inbox, transformed into an SMS message and pushed to a mobile device associated with the user. The SMS message can be automatically generated after specific events are identified at the backend system.

Generally, this approach allows each user to receive instant business information and alerts on any SMS-enabled mobile device without the need for special software or devices. Additionally, the SMS message can be created using an enhanced SMS protocol, allowing for the SMS message to be enriched with additional information and metadata from the backend system, all delivered to the user's mobile device and using a standard SMS infrastructure. The additional information can be interpreted and decoded by a mobile client application associated with the backend system that is installed at the mobile device. Using the mobile client application, one or more mobile business applications can be launched based on the parameters and metadata included within the enhanced SMS message. In some instances, the mobile client application can identify when an enhanced SMS message is received at the mobile device, causing the enhanced SMS message to be identified as a new incoming business alert to the user (as opposed to a normal SMS message). The user can then navigate, via the mobile client application, to access the alert, open the relevant mobile application, and connect to the backend system to access the appropriate business process, user interface, and other information defined by the metadata and parameters included within the enhanced SMS message.

FIG. 1 illustrates an example environment 100 for implementing various features of a system providing generic push notifications to mobile devices. The illustrated environment 100 includes, or is communicably coupled with, a business application server 103 and at least one mobile device 148. At least some of the mobile devices 148 may communicate across or via network 142. In general, environment 100 depicts an example configuration of a system for providing generic business application push notifications from the business application server 103 to the one or more mobile devices 148 to provide current information and notifications to the users of the mobile devices 148. The information and notifications are received through a standard messaging channel, such as an SMS messaging architecture. In many implementations, no changes to the underlying SMS (or alternative) messaging channel are necessary. The environment 100 is an example, and in alternative implementations, the elements illustrated in FIG. 1 may be included in or associated with different and/or additional servers, mobile devices, networks, or locations other than those as shown. For example, one or more of the components illustrated within the business application server 103 may be located in multiple or different servers, cloud-based networks, or other locations accessible to the business application server 103 (e.g., either directly or indirectly via network 142).

In general, the business application server 103 is any server that stores and executes business processes 115 via one or more business applications 112. For example, each business application server 103 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, each business application server 103 may store a plurality of various other applications, while in other instances, each business application server 103 may be a dedicated server meant to store and execute a particular business application 112 and its related functionality. In some instances, the business application server 103 may comprise a web server or be communicably coupled with a web server, where one or more of the business applications 112 associated with the business application server 103 represent web-based (or web-accessible) applications accessed and executed through requests and interactions received on one or more mobile devices 148, executing one or more mobile device applications operable to interact with the programmed tasks or operations of the corresponding business application 112.

At a high level, the business application server 103 comprises an electronic computing device operable to receive, transmit, process, store, or manage data and information associated with the environment 100. The business application server 103 illustrated in FIG. 1 can be responsible for receiving application requests from one or more mobile devices 148 (as well as any other entity or system interacting with the business application server 103, including desktop or other non-mobile client systems), responding to the received requests by processing said requests in the associated business application 112, and sending the appropriate responses from the business application 112 back to the requesting mobile device 148 or other requesting system. The business application 112 can also process and respond to local requests from a user locally accessing the business application server 103. Accordingly, in addition to requests from the mobile devices 148 illustrated in FIG. 1, requests associated with a particular business application 112 may also be sent from internal users, external or third-party customers, and other associated business applications or business processes, as well as any other appropriate entities, individuals, systems, or computers. In some instances, the business application 112 may be a web-based application executing functionality associated with a networked or cloud-based business process.

As used in the present disclosure, the term "computer" is intended to encompass any suitable processing device. For example, although FIG. 1 illustrates a single business application server 103, environment 100 can be implemented using any number of servers, as well as computers other than servers, including a server pool. Indeed, the business application server 103 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated business application server 103 may be adapted to execute any operating system, including Linux, UNIX, Windows, Mac OS, or any other suitable operating system.

In the illustrated implementation of FIG. 1, the business application server 103 includes an interface 106, a processor 109, a memory 127, and a business application 112. In some instances, the business application server 103 and its illustrated components may be separated into multiple components executing at different servers and/or systems. Thus, while illustrated as a single component in the example environment 100 of FIG. 1, alternative implementations may illustrate the business application server 103 as comprising multiple parts or portions accordingly.

FIG. 1 depicts both a server-client environment, but could also represent a cloud computing network. Various other implementations of the illustrated environment 100 can be provided to allow for increased flexibility in the underlying system, including multiple business application servers 103 performing or executing one or more additional or alternative instances of the business application 112, as well as other applications associated with or related to the business application 112, including those illustrated as included as part of the business application 112. In those instances, the different business application servers 103 may communicate with each other via a cloud-based network or through the connections provided by network 142.

The interface 106 is used by the business application server 103 to communicate with other systems in a client-server or other distributed environment (including within environment 100) connected to the network 142 (e.g., one of the mobile devices 148, as well as other systems communicably coupled to the network 142). The interface 106 generally comprises logic encoded in software and/or hardware in a suitable combination and operable to communicate with the network 142. More specifically, the interface 106 may comprise software supporting one or more communication protocols associated with communications such that the network 142 or the interface's hardware is operable to communicate physical signals within and outside of the illustrated environment 100.

Generally, the business application server 103 may be communicably coupled with a network 142 that facilitates wireless or wireline communications between the components of the environment 100 (i.e., between the business application server 103 and one or more mobile devices 148), as well as with any other local or remote computer, such as additional clients, servers, or other devices communicably coupled to network 142, including those not illustrated in FIG. 1. In the illustrated environment, the network 142 is depicted as a single network, but may be comprised of more than one network without departing from the scope of this disclosure, so long as at least a portion of the network 142 may facilitate communications between senders and recipients. In some instances, one or more of the components associated with the business application server 103 may be included within the network 142 as one or more cloud-based services or operations.

The network 142 may be all or a portion of an enterprise or secured network, while in another instance, at least a portion of the network 142 may represent a connection to the Internet. In the illustrated example, at least a portion of the network 142 includes a portion of a cellular or mobile data network or other network capable of relaying SMS messages. In some instances, a portion of the network 142 may be a virtual private network (VPN). Further, all or a portion of the network 142 can comprise either a wireline or wireless link. Example wireless links may include 802.11a/b/g/n, 802.20, WiMax, and/or any other appropriate wireless link. In other words, the network 142 encompasses any internal or external network, networks, sub-network, or combination thereof operable to facilitate communications between various computing components inside and outside the illustrated environment 100. The network 142 may communicate, for example, Internet Protocol (IP) packets, Frame Relay frames, Asynchronous Transfer Mode (ATM) cells, voice, video, data, and other suitable information between network addresses. The network 142 may also include one or more local area networks (LANs), radio access networks (RANs), metropolitan area networks (MANs), wide area networks (WANs), all or a portion of the Internet, and/or any other communication system or systems at one or more locations. As illustrated, the network 142 includes a SMS router 145 component. In some instances, the SMS router 145 may be a component of a cellular or other data transmission company or other entity, where SMS messages are sent to be forwarded to a specific location, such as a mobile device associated with a specific phone number.

As illustrated in FIG. 1, the business application server 103 includes a processor 109. Although illustrated as a single processor 109 in the business application server 103, two or more processors may be used in the business application server 103 according to particular needs, desires, or particular embodiments of environment 100. The processor 109 may be a central processing unit (CPU), a blade, an application specific integrated circuit (ASIC), a field-programmable gate array (FPGA), or another suitable component. Generally, the processor 109 executes instructions and manipulates data to perform the operations of the business application server 103 and, specifically, the functionality associated with the corresponding business application 112. In one implementation, the server's processor 109 executes the functionality required to receive and respond to requests and instructions from the one or more mobile devices 148, as well as the functionality required to perform the operations of the associated business application 112.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, each processor 109 executes the corresponding business application 112 stored on the associated business application server 103. In some instances, a particular business application server 103 may be associated with the execution of two or more business applications 112, as well as one or more distributed applications executing across two or more business application servers 103.

At a high level, each business application 112 is any application, program, module, process, or other software that may execute, change, delete, generate, or otherwise manage information associated with a particular business application server 103, and in some cases, a business process performing and executing business process-related events. In particular, business processes communicate with other users, applications, systems, and components to send and receive events. In some instances, a particular business application 112 may operate in response to and in connection with one or more requests received from an associated mobile device 148 or other remote client. Additionally, a particular business application 112 may operate in response to and in connection with one or more requests received from other business applications 112, including a business application associated with another business application server 103. In some instances, each business application 112 may represent a web-based application accessed and executed by remote clients, including a mobile device 148, via the network 142 (e.g., through the Internet, or via one or more cloud-based services associated with the business application 112). Further, while illustrated as internal to the business application server 103, one or more processes associated with a particular business application 112 may be stored, referenced, or executed remotely. For example, a portion of a particular business application 112 may be a web service that is remotely called, while another portion of the business application 112 may be an interface object or agent bundled for processing at a remote system (not illustrated) or at the mobile device 148 (e.g., the business application mobile player 160). Moreover, any or all of a particular business application 112 may be a child or sub-module of another software module or enterprise application (not illustrated) without departing from the scope of this disclosure. Still further, portions of the particular business application 112 may be executed or accessed by a user working directly at the business application server 103, as well as remotely at a corresponding mobile device 148 or other client.

The business application 112 is illustrated as including one or more business processes 115, a notification engine 118, an SMS generator/adapter 121, and an update monitor 124. The one or more business processes 115 may define various operations, steps, interactions, and other events that make up a particular overall business process or process model. In some instances, the business application 112 may be associated with one or more business process models that define the various interactions associated with the business application 112 (or different instances thereof). The business application 112 may be a generic application that executes operations based on the definitions and instructions associated with the business processes 115 (or combinations thereof). All, some, or none of the modules or components illustrated as part of the business application 112 may be included in other business application servers 103. Additionally, some or all of the modules or components may be combined with each other, as well as integrated into the functionality provided by another component, or inherently by the business application 112.

The notification engine 118 may be any module, agent, or component of or associated with the business application 112 that can communicate with users to provide notifications as relevant events associated with the business application 112 occur. The notification engine 118 may also be separate from and/or external to the business application 112 in some instances. If one of the business processes 115 requires input from a user, the notification engine 118 may generate the appropriate message, including SMS or MMS messages as well as other suitable formats such as email, to be sent to the relevant users. Additional events associated with business processes 115 executed by the business application 112 may also generate notifications, including tasks to be performed by a particular user in a workflow, warnings and error reports, as well as other suitable information. In some instances, the notification engine 118 may use or access a portion of a customer database 130 stored in memory 127 to identify the appropriate entities, groups, or individuals associated with a particular business process 115 or event within or associated with the business process 115. For example, when an event needing user input occurs, the notification engine 118 can access the customer database 130 to determine the associated user, information on the messaging address, phone number, or other communication-related address to send the notification. In some instances, the notification engine 118 may work with the update monitor 124 to determine when notifications and other messages are to be sent. The update monitor 124 can determine when notification-related messages are to be generated, and can invoke the notification engine 118 to do so. Additionally, the update monitor 124 may receive input from the mobile device 148 and other remote clients or systems, updating the business processes 115 and business application 112 in response to information and other submissions received from users at those systems. In some instances, the update monitor 124 may comprise one or more process agents, which can identify and react to changes on business data and processes that may occur within, or associated with, the business application 112. In some implementations, the update monitor 124 may be a plurality of distributed process agents that can monitor specific business information or processes for modifications or events, such as business objects, and generate or initiate the generation of tasks, notifications, and messages associated with the monitored modifications or events. In end-to-end applications, as well as in other enterprise systems, different update monitors 124 can be associated with different components of the end-to-end application. The update monitor 124 can analyze the monitored information, modifications, and events, extract relevant data, and provide the information to the appropriate component to generate the notification message. In some instances, the update monitor 124 may be able to generate the message or notification, incorporating functionality described herein as associated with the SMS generator/adapter 121 and the notification engine 118.

The SMS generator/adapter 121 can format the notifications created by the notification engine 118 into messages compatible with an SMS (or other appropriate) system. The SMS generator/adapter 121, similar to some implementations of the notification engine 118, can access the customer database 130 to identify the appropriate format of the messages to be sent to the users of mobile devices 148 and other clients/systems. In some instances, information stored in the customer databases 130 can determine the appropriate type of message to be sent, including but not limited to an SMS message, an MMS message (possibly including pictures, graphs, etc.), or an email. In some instances, information about the capabilities of particular mobile devices 148 and clients may be stored in the customer database, as well as information on customer settings/preferences 136 and user-specific settings/preferences 139. That information can be used to determine, for instance, whether a standard or enhanced SMS message is to be generated. If, for instance, the associated user's mobile device 148 is not capable of smartphone features (including running non-native or otherwise advanced applications), or the user or customer (i.e., the user's employer) has elected to only receive notifications) the SMS generator/adapter 121 may generate a simple SMS message including only a basic notification of the relevant event that has occurred. If, however, the associated user's mobile device 148 is determined to be smartphone, an enhanced SMS message can be generated and sent.

Generally, a simple notification message (i.e., not enhanced) will include a short message relevant to the event that has occurred to trigger the notification as addressed to the user (or group of users) for which the event is relevant. For example, a supervisor's approval may be needed based on some event (i.e., a vacation request). IN those events, the associated business process 115 may generate a task for the supervisor, where the described system can generate a notification for the supervisor notifying that supervisor that action on his or her part is now required. For the simple message, a simple notification of the task (such as a task type and the task description) may be included in the message. An enhanced message can include both the notification portion, as well as additional encoding of metadata, parameters, and other information from the business application 112 or business processes 115. In some instances, the business application 112 or business processes 115 may identify certain information that can be used at the mobile device 148 to open or initiate a client application associated with the business application 112, such as the business application mobile player 160, to a particular set of information associated with the event, action, or task for which the notification is generated. In one example, the information related to the event, action, or task can be provided to the notification engine 118 (or the SMS generator/adapter 121), such as by the update monitor 124, with the information being modified into a format known to the business application 112 and the client application (i.e., the business application mobile player 160). The commonly-known format can be used to encode information that will be decoded by the client application, and used to open the appropriate mobile business application 163 associated with the message. In some instances, the encoded information can trigger the opening of the appropriate mobile business application 163, as well as the retrieval of an associated set of business information from the business application 112 (via network 142). Generally, the notification engine 118 and/or the SMS generator/adapter 121 can access an enhanced message protocol definition 129 to determine the appropriate rules and structure to apply to enhanced messages. The mobile device 148 may also include a stored message protocol definition 169 that allows the mobile device 148 and its applications to analyze and understand any received enhanced messages. Once the standard and/or enhanced messages are generated, the messages can be sent to the appropriate mobile device 148 (via network 142) using any suitable messaging techniques.

The business application server 103 also includes a memory 127 for storing data and program instructions. The memory 127 may include any memory or database module and may take the form of volatile or non-volatile memory including, without limitation, magnetic media, optical media, random access memory (RAM), read-only memory (ROM), removable media, or any other suitable local or remote memory component. The memory 127 may store various objects or data, including classes, frameworks, applications, backup data, business objects, jobs, web pages, web page templates, database tables, process contexts, repositories storing services local to the business application server 103, and any other appropriate information including any parameters, variables, algorithms, instructions, rules, constraints, or references thereto associated with the purposes of the server 103 and its business application 112. In some implementations, including a cloud-based system, some or all of the memory 127 may be stored remote from the business application server 103, and communicably coupled to the business application server 103 for usage. As illustrated, memory 127 includes the enhanced message protocol 129 and the customer database 130.

As described, the enhanced message protocol 129 may be any file or schema defining one or more potential messaging structures for encoding various metadata and technical information within an SMS or other appropriate message. In general, the enhanced message protocol 129 is meant to allow information associated with a business application 112 or business process 115 to be sent within messages that can be understood and interpreted at the mobile device 148. For instance, the enhanced message protocol 129 may allow detailed information to be included within a limited-character SMS message, so that the SMS message can be interpreted and decoded at the mobile device 148. In some instances, the information can be encoded as a hyperlink to launch one of the mobile business applications at the mobile device 148, along with a set of information identifying various parameters and information defining a location or state in which the application is to be launched. By providing the enhanced message protocol 129 to the mobile device 148 (as enhanced message protocol 169), the mobile device 148 can interpret the encoded instructions and information, and allow detailed information to be passed within the confines of various mobile communication technologies.

The customer database 130 illustrated within memory 127 can provide information on customers, entities, and users for use with the business application 112 and the messaging solution. In some instances, the customer database 130 may be a part of an enterprise resource management (ERP) system, with the customer database 130 representing associations and assignments of the business application 112 and its business processes 115 to particular customers, entities, and users. The customer database 130 can define which processes 115 and events are to be handled by which users. The business application 112 can reference the customer database 130 to determine which events are associated with particular users for a customer, and can operate accordingly. When implementing the techniques of the present disclosure, the customer database 130 can be used to identify the user associated with an event or notification, the contact information associated with that particular user (i.e., a mobile phone number for sending an SMS or other suitable message), the messaging settings 136 of the customer, and user-specific settings 139. The user information 133 can define the roles of different users, which may be interpreted by the business application 112 to associate events and processes with the correct users. The user information 133 can also include contact information for those users. The customer settings 136 may represent customer-wide settings for certain functionality, including whether enhanced messaging is allowed or approved for the customer. If enhanced messaging is not approved, only simple or standard messages may be sent. The user-specific settings 139 may define settings and preferences that are particular to specific users, as well as information on the type of mobile device 148 that certain users are associated with. Specific settings may be defined as to whether a particular user elects to receive enhanced messages or not, as well as how those messages are to be provided. In some instances, the user-specific settings 139 may include information on the type of mobile device 148 associated with the user, as well as the capabilities of that device 148. If the mobile device 148 is not capable of interacting with enhanced messages, the notification engine 118 and the SMS generator/adapter 121 can dynamically prepare the messages accordingly based on the type or capabilities of the mobile device 148. In some instances, information on the mobile business applications installed on a particular mobile device 148 associated with a particular user may be stored. If the user has not installed the appropriate mobile application for a particular notification, then the system can generate a simple message (i.e., so that a request to launch a mobile business application that is not available to the user is not included in the message). Alternatively, the enhanced message may be generated to include instructions or a hyperlink to allow the user of the mobile device 148 to install the appropriate mobile business application 163.

The mobile device 148 may be any mobile computer device operable to connect or communicate with business application server 103 and/or the network 142 using a wireless or wireline connection (i.e., network 142). In particular, the mobile device 148 may be embodied as a cell phone, personal digital assistant (PDA), smart phone, wireless messaging device, or other suitable type of mobile computing device. There may be any number of mobile devices 148 associated with environment 100 at any point in time. At a high level, each mobile device 148 can include a processor 154, a GUI 172, one or more mobile business applications 163, a business application mobile player 160, an SMS/MMS manager 157, a memory 166, and an interface 151. In general, the mobile device 148 comprises an electronic computer device operable to receive, transmit, process, and/or store any appropriate data associated with the one or more mobile business applications 163 and/or the business application mobile player 160. In one example, the mobile device 148 may be a smartphone that includes an input device, such as a keypad, touch screen, mouse, trackball, or other device that can accept information, and an output device that conveys information associated with the operation of the mobile device, including digital data, visual information, or the GUI 172. Both the input device and the output device may include fixed or removable storage media, such as a magnetic computer disk, CD-ROM, or other suitable media to both receive input from and provide output to users of the mobile device 148 through the display, namely the GUI 172.

The interface 151 of the mobile device 148 may be similar to the interface 106 of the business application server 103, in that it may comprise logic encoded in software and/or hardware in a suitable combination and operable to communicate with the network 142. More specifically, interface 151 may comprise software supporting one or more communication protocols such that the network 142 or hardware is operable to communicate physical signals to and from the mobile device 148. The interface 151 may be specially designed for mobile devices, and may allow for communications with data and cellular networks, as well as Wi-Fi connections.

Similarly, memory 166 of the mobile device 148 may include any memory or database module and may take the form of volatile or non-volatile memory including, without limitation, magnetic media, optical media, random access memory (RAM), read-only memory (ROM), removable media, or any other suitable local or remote memory component. For example, memory 166 may store mobile business applications 163, backup data, parameters, cookies, variables, algorithms, instructions, rules, or references thereto. As illustrated, memory 166 can include a copy or version of the enhanced messaging protocol 169 that can be accessed by the business application mobile player 160 and any other suitable components to interpret and decode enhanced messages received at the mobile device 148.

In some instances, processor 154 may be similar to processor 109. In other instances, the processor 154 may be a processor designed specifically for use in mobile devices such as smartphones or PDAs. Further, although illustrated as a single processor 154, the processor 154 may be implemented as multiple processors in the mobile device 148. Regardless of the type and number, the processor 154 executes instructions and manipulates data to perform the operations of the mobile device 148, including operations to receive and process information from the business application server 103, access data within memory 166, execute the mobile business applications 163, business application mobile player 160, and the SMS/MMS manager 157, as well as perform other operations associated with the mobile device 148.

The SMS/MMS manager 157 may be any program executing on the mobile device 148 that performs the operations associated with sending and receiving SMS and MMS messages. In some instances, the SMS/MMS manager 157 may also be used as an email client, performing the operations associated with sending and receiving email messages, as well. The SMS/MMS manager 157 may be a program initially installed with the device 148, or it may be a program downloaded to the device 148 by the user.

The business application mobile player 160 may be an application provided to one or more different mobile platforms. The business application mobile player 160 can be communicably connected to the business application server 103, and can be used to manage the launch of the various mobile applications 163 installed on the mobile device 148. In some implementations, the business application mobile player 160 may present the user with a list of the installed mobile business applications 163, allowing the user to select which of those applications to install via user input. In some instances, the business application mobile player 160 can be used in conjunction with the SMS/MMS manager 157 to identify received messages associated with notifications from the business application server 103. The business application mobile player 160 can, in some instances, interpret and decode received enhanced messages (i.e., using the enhanced message protocol 169) to identify and launch a particular mobile business application 163 referenced by the enhanced message. Additionally, the business application mobile player 160 can parse and pass any encoded parameters or additional information included in the enhanced message, and use those in launching the appropriate mobile business application 163 to a particular location or state.

The mobile business applications 163 represent versions of different business applications optimized for use on the mobile device 148. In some instances, the mobile business applications 163 may be web-based applications that are accessed via network 142, whereas in other instances, the mobile business applications 163 may be mobile versions of one or more enterprise applications or suites. The mobile business applications 163 may retrieve application-related information from a corresponding business application server 103, or the applications 163 may access a locally cached set of business application-related information (not shown) stored on the mobile device 148, such as within memory 166. Where an enhanced message is received at the mobile device 148 via the business application mobile player 160, parameters, metadata, and other information encoded within the enhanced message can be passed to the mobile business application 163 for use at launch (or alternatively, queued for future use). In some instances, the mobile business application 163 can use the parameters, metadata, and other information received at launch to access a particular set of data from the business application server 103, where the particular set of data is related to the received enhanced message and notification. In such a manner, the mobile business application 163 can immediately or quickly be placed into a state appropriate for processing the business task, event, or information associated with the notification. Once a particular mobile business application 163 is launched into a state associated with the notification, the user can interactively process the task, event, or other information associated with the notification.

The GUI 172 is a graphical user interface operable to allow the user of the mobile device 148 to interface with at least a portion of the system 100 for any suitable purpose, including to allow a user of the mobile device 148 to interact with one or more of the mobile business applications 163, as well as any other mobile device 148 applications and/or functionality. The term "graphical user interface," or GUI, may be used in the singular or in the plural to describe one or more graphical user interfaces and each of the displays of a particular graphical user interface. Therefore, the GUI 172 can be any graphical user interface, such as a generic web browser, touch screen, or command line interface (CLI) that processes information in the system 100 and efficiently presents the results to a user. Generally, the GUI 172 provides the mobile device 148 with an efficient and user-friendly presentation of data provided by or communicated within the system 100. In particular, the GUI 172 may provide users of the mobile device 148 with visualization representations of the mobile business applications 163, business application mobile player 160, SMS/MMS manager 157, and other mobile device 148 functionality. The GUI 172 may include a plurality of user interface (UI) elements such as interactive fields, pull-down lists, and buttons operable at the mobile device 148. These UI elements may be related to the functions of the mobile business application 163. The GUI 172 may also be associated with an input device, such as a touchscreen, such that gestures and touches are registered by the mobile device 148 to represent input related to output presented within the GUI 172. The mobile device 148 can interpret that input to response and update the corresponding mobile business application 163 or other presented information and/or application.

While FIG. 1 is described as containing or being associated with a plurality of components, not all components illustrated within the illustrated implementation of FIG. 1 may be utilized in each implementation of the present disclosure. Additionally, one or more of the components described herein may be located external to environment 100, while in other instances, certain components may be included within or as a portion of one or more of the other described components, as well as other components not described. Further, certain components illustrated in FIG. 1 may be combined with other components, as well as used for alternative or additional purposes, in addition to those purposes described herein.

Figure 2:
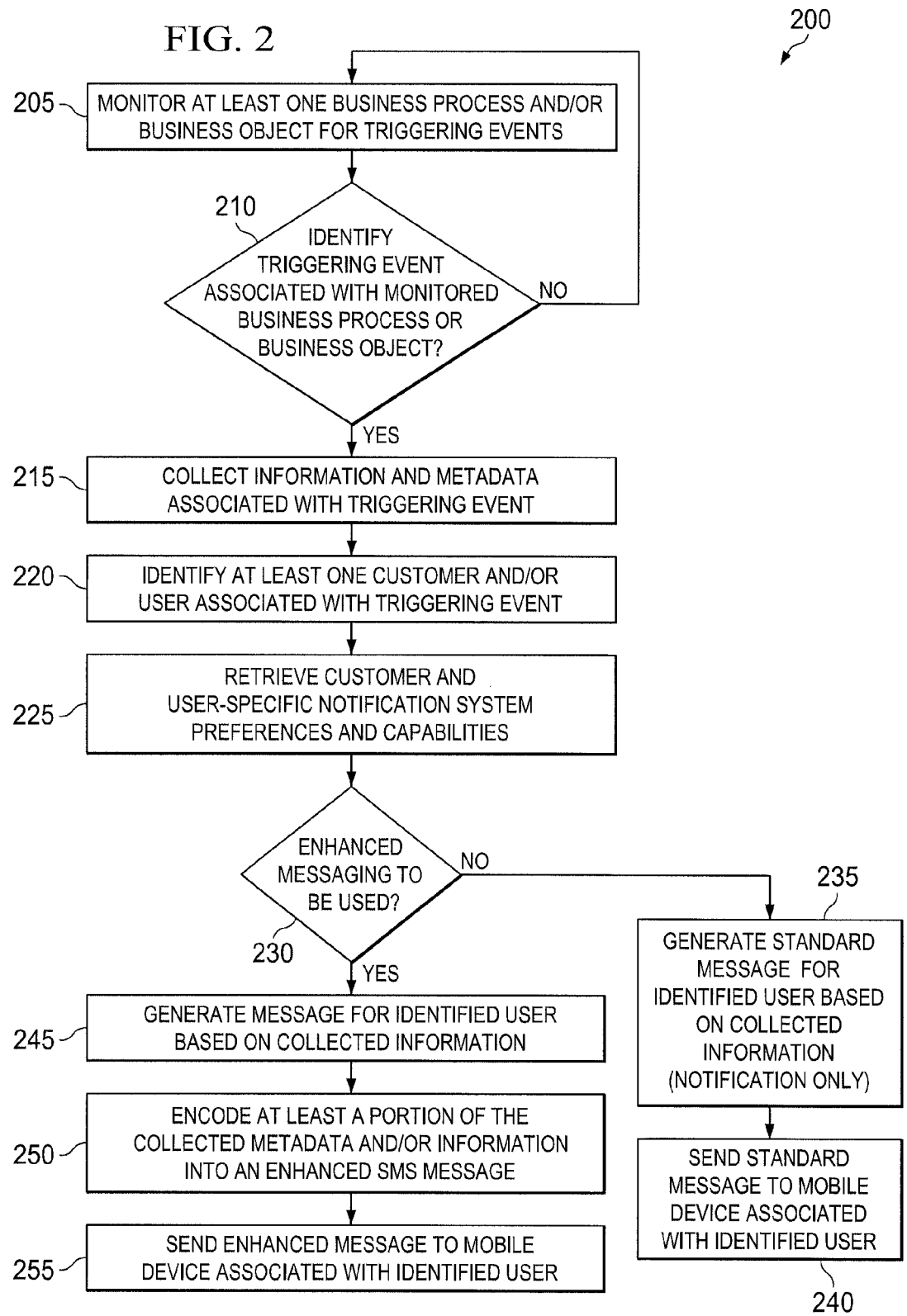
FIG. 2 is a flowchart of an example process for generating and sending generic push notifications to mobile devices from a backend system.

FIG. 2 is a flowchart of an example process 200 for generating and sending generic push notifications to mobile devices from a backend system, such as the business application server 103. For clarity of presentation, the description that follows generally describes process 200 in the context of environment 100 illustrated in FIG. 1. However, it will be understood that process 200 may be performed, for example, by any other suitable system, environment, or combination of systems and environments, as appropriate.

At 205, at least one business process (or business object) is monitored for an event that will trigger the generations of an SMS message to a mobile device, such as mobile device 148. Monitoring may, in some cases, be performed by a process agent associated with a particular set of information or portion of a business process within a business application. At 210, a determination is made as to whether a triggering event associated with the monitored business process or information is identified. Triggering events can include any suitable event, including new tasks generated for a particular user as part of a business process, alerts based on changes to business process information, among others. In general, any business process status change may be a triggering event. One example event may be the changing of status of a particular business object, such as changing an Invoice business object's status from "open" to "released." If no triggering events are identified, process 200 returns to 205. However, if a triggering event is identified, process 200 continues to 215.

At 215, a relevant set of information and metadata associated with the triggering event are collected. The collected data may include the action the action that caused the triggering event, the result of the event, the next operation to be performed in the associated business process or application, a set of information resulting from the triggering event, as well as any other information. Additionally, a process instance and/or a business object instance could be included in the collected data, such as, for example, the document number of the business object whose status changed. For example, if a purchase order needs to be approved, the purchase order ID could be included in the collected data so the user could be sent directly to the purchase order instance associated with the collected purchase order ID, as opposed to the complete list of purchase orders that need to be approved. Additionally, information and metadata defining a particular process location within a corresponding business process can be collected to provide the next user with a clear location within the overall business process at which the notification is associated. The information can later be used to provide users at a mobile device with immediate notification of from where in the business process to continue.

At 220, at least one customer and/or user associated with the triggering event is identified. In some instances, the customer and user associated with the triggering event can be identified by querying a customer database identifying the roles and identification of users associated with the business process. For example, if the triggering event is a request for vacation from an employee, the customer database can be searched to identify a user who is the supervisor of the employee. In some instances, the address associated with one or more mobile devices which are in turn associated with the identified customer can also be identified at 220. The addresses can include email addresses, mobile phone numbers, instant messaging (IM) screen names, social networking screen names, and other suitable addresses.

At 225, a set of customer-specific and a set of user-specific notification system preferences and capabilities are retrieved. The preferences and capabilities can provide an explicit customization or parameter defining whether enhanced messages are allowed for the particular customer, as well as whether the associated user has selected to receive enhanced messages. Additionally, the preferences and capabilities may include information on the type of mobile device used by a particular user, which can be used to determine whether enhanced messages are compatible with the mobile device. The capabilities may also define a set of mobile business applications installed on the user's mobile device, allowing a determination to be made as to whether the notification or triggering event can be processed at the user's mobile device. In some instances, the user-specific preferences may include specific times and events for which they agree to receive enhanced messages, and for which they do not. The sets of information can include any suitable customer or user-specific information that can be used to determine if and how enhanced messages are to be sent, including formatting information on how enhanced messages are to be formatted and sent.

At 230, a determination as to whether enhanced messaging is to be used is made. In some instances, the determination can be based, at least in part, from the retrieved sets of customer-specific and user-specific preferences and capabilities, as well as on the type of triggering event and its associated action to be performed. For example, if the associated user's mobile device cannot receive and process an enhanced message, or the appropriate mobile business application is not installed, enhanced messaging may not be used. If the customer has chosen not to use enhanced messages, even if the user's mobile device is capable, then enhanced messaging may not be used. If enhanced messaging is to be used, process 200 continues at 245. If not, process 200 continues at 235.

At 235, a standard message, such as an SMS message, is generated for the identified user based on the collected information and metadata (from 215). The standard message will generally not include information other than an identification of the triggering event or task to be completed in response to the triggering event. The standard message can be created in a standard, predefined format associated with the type of notification to be sent. The standard message may be formatted similar to a corresponding enhanced message, without additional information encoded within the standard message. Once generated, the standard message is sent to the mobile device (or address) associated with the identified user at 240. Sending the standard message can include sending the message using any suitable service, including an SMS service or email.

At 245, a message is generated for the identified user based on information previously collected (i.e., at 215). The message generated at 245 may be similar to the standard message generated at 235, in that the information associated with the message may be generated to identify the triggering event or task to be completed in response to the triggering event. At 250, however, at least a portion of the collected metadata and/or information associated with the triggering event or task to be completed is encoded into the message to create an enhanced message. In some instances, the enhanced message may include information that defines the associated mobile business application associated with the message, information on the particular business process that is referenced by the message, as well as other suitable information that can be used to allow the receiving mobile device to launch the appropriate mobile business application, retrieve the data associated with the message, and present the current view or portion of the mobile business application at launch (or shortly thereafter). The information can be encoded in a format known to both the backend system and the mobile device. The format may be defined by a specific enhanced message protocol or other suitable means. In some instances, a uniform resource locator (URL) may be included in the message that can be used to access a specific set of information associated with the triggering event, with that information being accessed by the mobile device in lieu of decoding the enhanced message. The URL can be used to launch a particular mobile application on the mobile device. Alternatively, the encoded information can be decoded to provide instructions and what mobile business application to launch, as well as the parameters and state in which to launch it. Once generated, the enhanced message is sent to the mobile device (or address) associated with the identified user at 255. Sending the enhanced message can include sending the message using any suitable service, including an SMS service or email.

Figure 3:
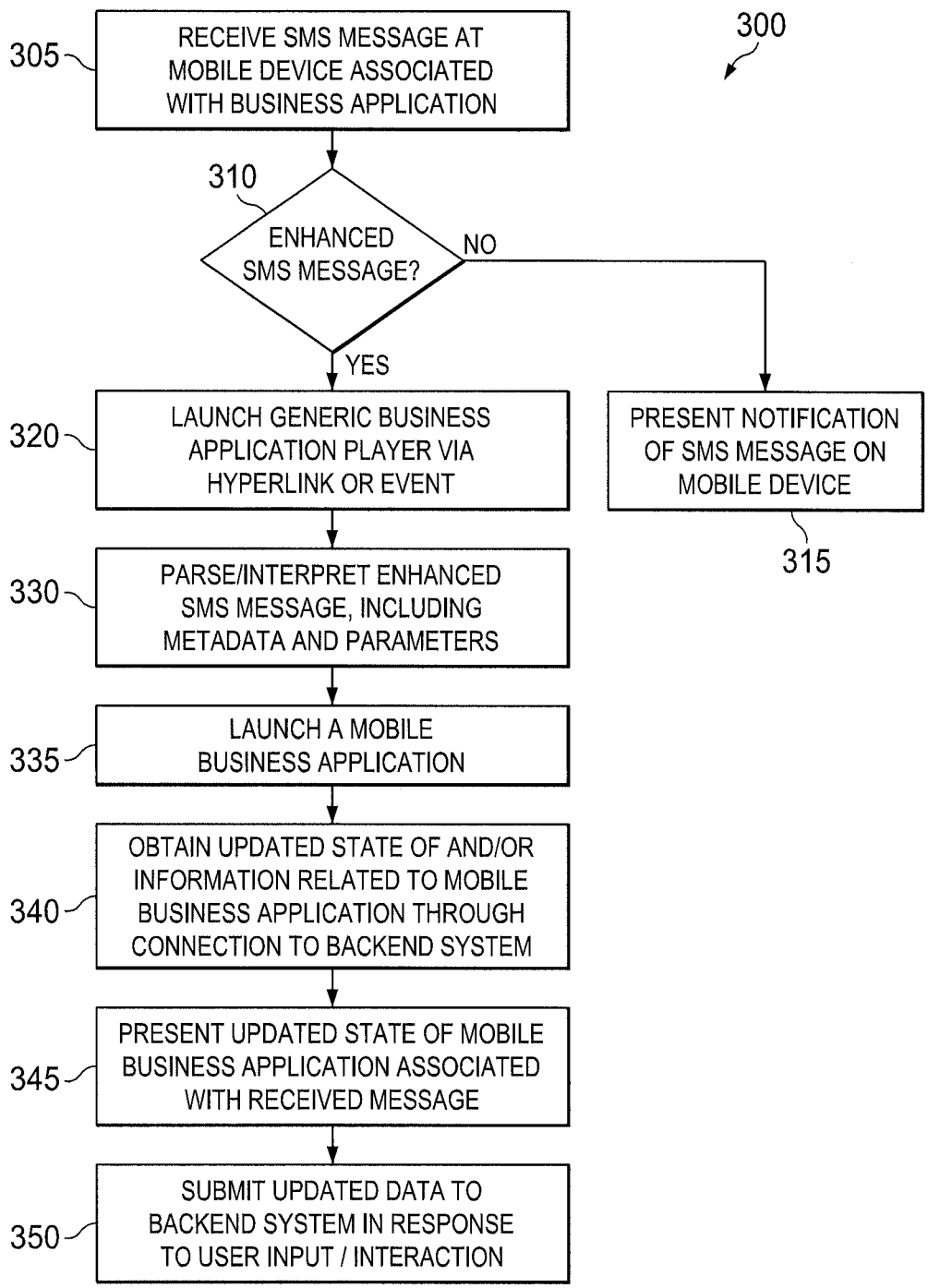
FIG. 3 is a flowchart of an example process for receiving, interpreting, and responding to push notifications received at a mobile device.

FIG. 3 is a flowchart of an example process 300 for receiving, interpreting, and responding to push notifications received at a mobile device, such as mobile device 148 of FIG. 1. For clarity of presentation, the description that follows generally describes process 300 in the context of environment 100 illustrated in FIG. 1. However, it will be understood that process 300 may be performed, for example, by any other suitable system, environment, or combination of systems and environments, as appropriate.

At 305, an SMS message (or other suitable message type) associated with a backend business application system, such as business application server 103 illustrated in FIG. 1, is received at the mobile device. Generally, many types of messages can be received at a particular mobile device. For purposes of process 300, the received messages are considered to be messages associated with the backend business application system. Other messages can be handled normally for the mobile device, including other SMS messages that may be received from other sending entities or individuals.

At 310, a determination is made as to whether the received message is a standard message or an enhanced message. In some instances, the determination may be based on a particular header, title, sending party, or other identifying information included with the received message. In some instances, a module, agent, or application may be associated with the components that normally handle received messages at the mobile device, and can identify the messages as standard or enhanced messages associated with the business application. In those instances, the module, agent, or application may also be able to filter all received messages to those associated with the business application. If it is determined that the received message is not an enhanced message, a notification of the SMS message can be presented on the mobile device at 315. In those instances, the non-enhanced message can be stored in the standard SMS message inbox, with the message indicating that some action or event at the backend system needs to or has taken place. If, however, the message is determined to be an enhanced message, process 300 continues at 320.

At 320, a module or application capable of interacting with and interpreting enhanced messages can be launched based on a hyperlink or event. How the module (e.g., the business application mobile player 160 of FIG. 1) is launched can depend on the type of operating system executed on the mobile device. In some instances, the module may be launched through activation of a hyperlink included within the received message, while in others, the module may be launched after receipt of the message, where the module is automatically launched in response to the arrival or receipt of the message, including a launch that does not require user interaction. For example, if the mobile device is based on Apple's iOS operating system, the module can be launched from a hyperlink included within the enhanced message. The hyperlink can be used to launch the module, including passing any relevant parameters encoded within the URL. Additionally, for mobile devices running iOS, custom URL schemes may be created to launch registered applications instead of the mobile browser. If, for instance, a message was generated stating "Approve Leave Request of Jon Smith [mobilebusapp://leaverequestapproval/Jon_Smith]", the mobile business application identified by the identifier "mobilebusapp" can be launched. In those instances, the portion of the URL of "leaverequestapproval/Jon_Smith" could be passed to the mobile business application as parameters to be interpreted and acted upon. For Windows Mobile phones, the received message can be intercepted where appropriate. For example, SMS messages beginning with a predetermined identifier (i.e., "mobilebusapp") can be intercepted upon receipt and used to launch the corresponding mobile business application on the mobile device. The message itself can be parsed, with relevant information passed to the mobile business application as parameters to be used at launch. Different mobile platforms and operating systems are contemplated, with the solution capable of being modified to meet the requirements of different systems. In some instances, the module or application may be included in or associated with one or more of the mobile business applications installed on the mobile device. Alternatively, the appropriate mobile business application can be launched (see 335) without the module, such as in the implementation where the activated URL or hyperlink causes the appropriate mobile business application to be launched.

At 330, the contents of the received enhanced message is parsed and interpreted, including any metadata and/or parameters encoded in or included with the enhanced message. In some instances, a hyperlink included within the received message can include parameters and metadata within the associated URL. Additionally, information from the text of the enhanced message can include parameters and metadata, which can be identified when the enhanced message is parsed. In some instances, a mobile device-specific URL can be included in the enhanced URL (i.e., a unique identifier included with the URL), such that activating the mobile device-specific URL will cause a request to be sent to the backend system. The information returned from the backend system can identify the appropriate mobile business application to launch, the appropriate view or state of the mobile business application, or other relevant information.

At 335, the appropriate mobile business application associated with the enhanced message can be launched. In instances where a module (such as the business application mobile player 160 of FIG. 1) is used to interpret the enhanced message, the module can automatically determine which mobile business application to launch based on information from the received enhanced message. Alternatively, the mobile business application to launch can be determined based on additional information received from an accessed URL that was included within the enhanced message, with the accessed URL providing additional information on which mobile business application to launch. In another alternative, the particular mobile business application to be launched may be based on a user determination or instruction.

At 340, an updated state of and/or information related to the launched mobile business application is obtained through a connection to the backend system. In some instances, the initial launch state of, or parameters associated with, the mobile business application may be determined by information encoded within the enhanced message. Using the initial launch state, a corresponding request can be sent to the backend system to retrieve or obtain updated information for use with the mobile business application. In some instances, the updated state and the information related to the launched mobile business application may be the initial launch parameters or initial launch state, such that the state and information related to the mobile business application are obtained without a request to the backend system.

At 345, the updated state of the mobile business application associated with the received enhanced message is presented at the mobile device. The updated state of the mobile business application can include the functionality or operations associated with the current state of the underlying business process. At 350, a set of updated data can be optionally submitted to the backend system in response to user input or interaction received at the mobile device. For example, if the enhanced message was associated with a request for approval for vacation leave, the user of the mobile device can approve or deny the request and submit that decision via the mobile business application.

FIG. 4A includes an example illustration of a message pattern to be used in messages sent using one implementation of the present disclosure. The example pattern 400 for both standard and enhanced messages is provided. The illustrated pattern 400 includes a task type and an associated application identifier in the first portion of the message. The second portion includes a description of the task, as well as an optional portion for enhanced messages to include a hyperlink that can include one or more parameters and other embedded information. Example standard message 405 illustrates an example standard message. The task type is "Approval", the application identifier is "Design_Alert", and the task description is "annual leave request for Mr. Heinz Mustermann". The example enhanced message 410 further includes an embedded hyperlink associated with the relevant mobile business application, where the hyperlink includes an encoded parameter for use at launch. The URL is "www.xyz.com", with the parameter stating that "encoded parameter 1" is "abc". It should be understood that any number of alternative patterns can be used with the systems and methods described herein.

Figure 4B:
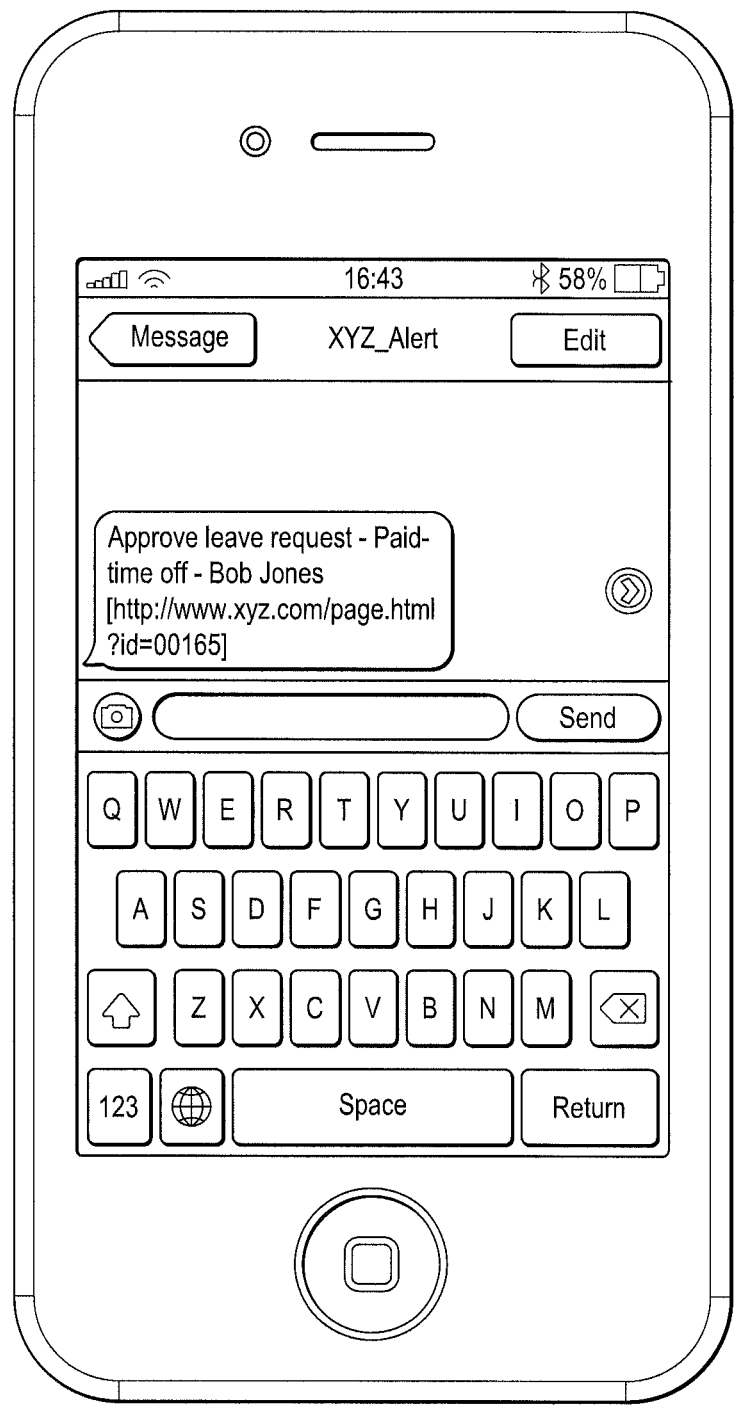
FIGS. 4B-4F illustrate example screenshots of generic push notifications and related operations.
Figure 4C:
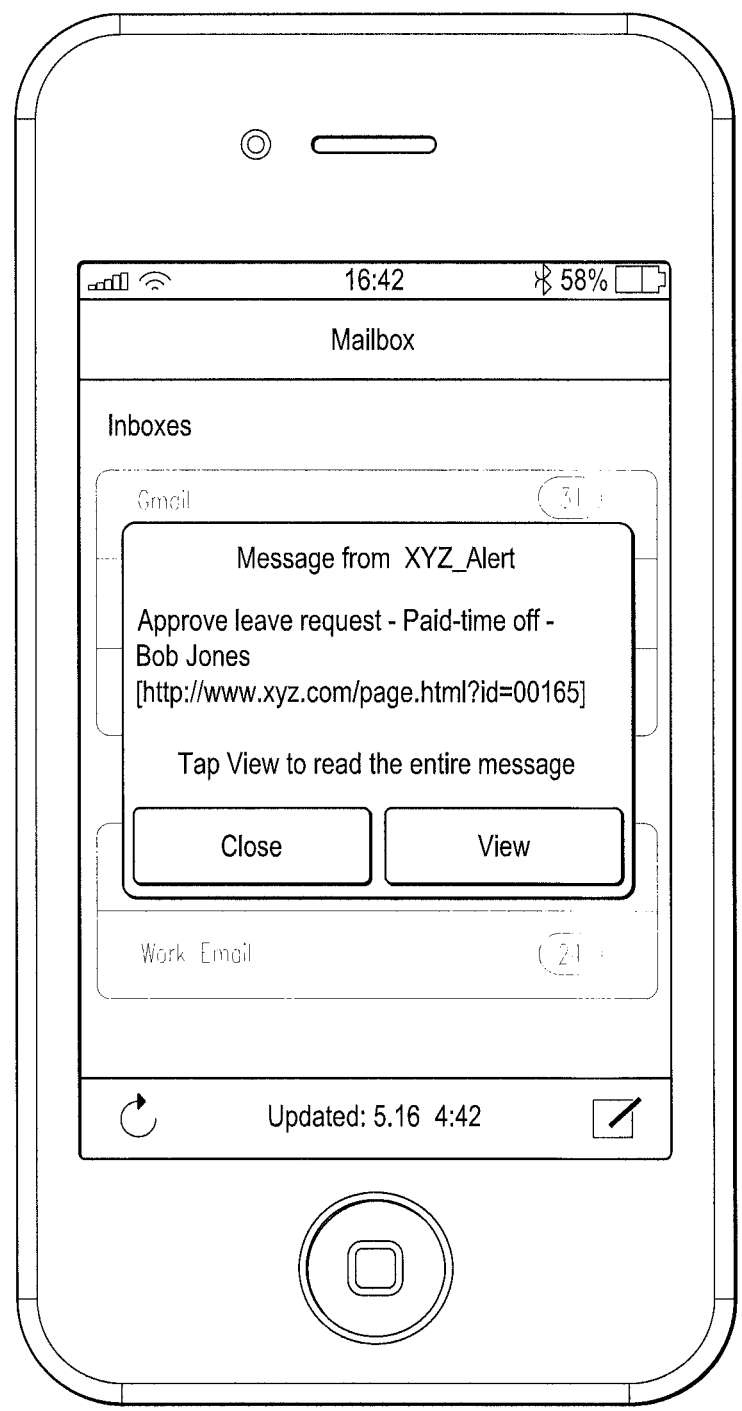

FIG. 4B illustrates one example enhanced message received on an Apple iPhone executing Apple's iOS. As illustrated, the message includes a task description ("Approve leave request—Paid time off—Bob Jones"), and an embedded hyperlink. The hyperlink, as shown, includes a URL ("http://www.xyz.com/page.html") and an encoded parameter embedded within the URL ("id=00165") that is associated with the notification, which can be passed to the mobile business application to identify, retrieve, or launch the mobile business application into the appropriate state. In the illustrated example, a user of the iPhone can activate the hyperlink, which can in turn launch a particular mobile business application associated with the notification (in some instances, via a business application mobile player or other appropriate intermediary component). FIG. 4C illustrates an example pop-up notification received when an SMS message and notification is pushed to the iPhone. The notification can be used to provide immediate information associated with the message, regardless of the current application executing on the mobile device.

Figure 4D:
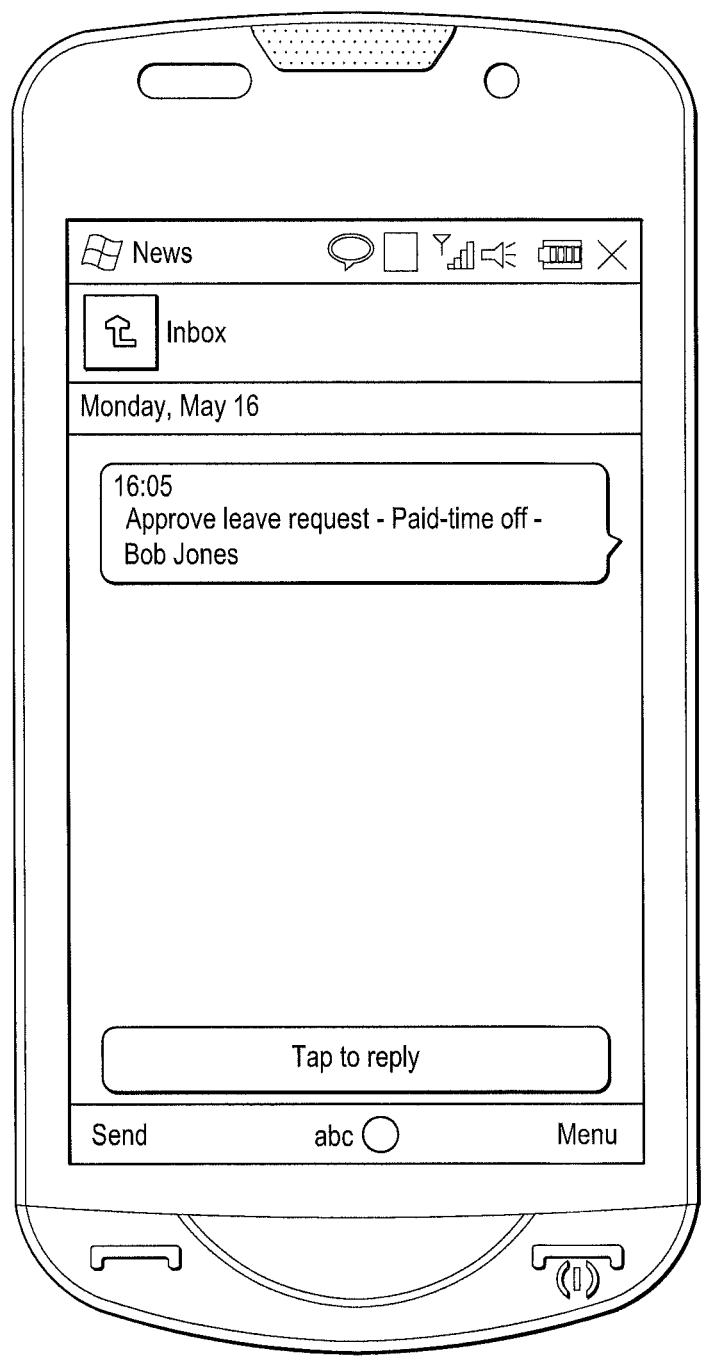
Figure 4E:
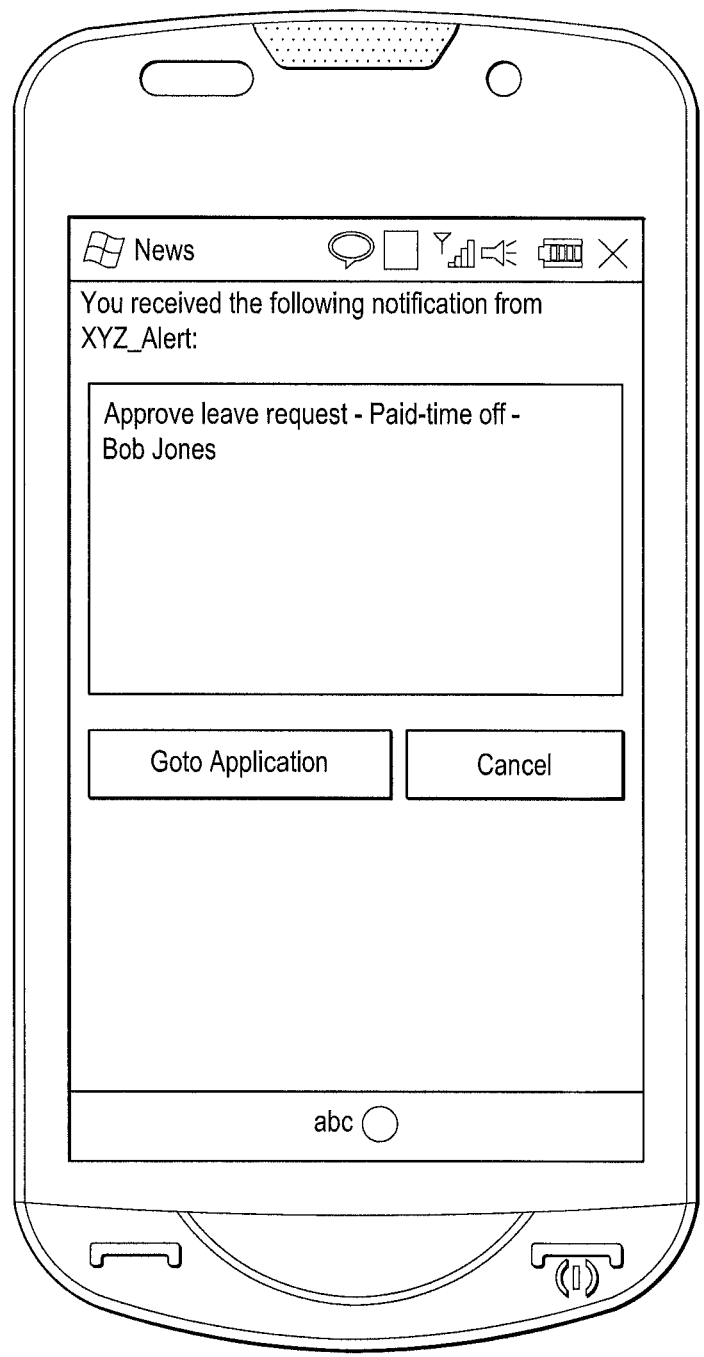
Figure 4F:
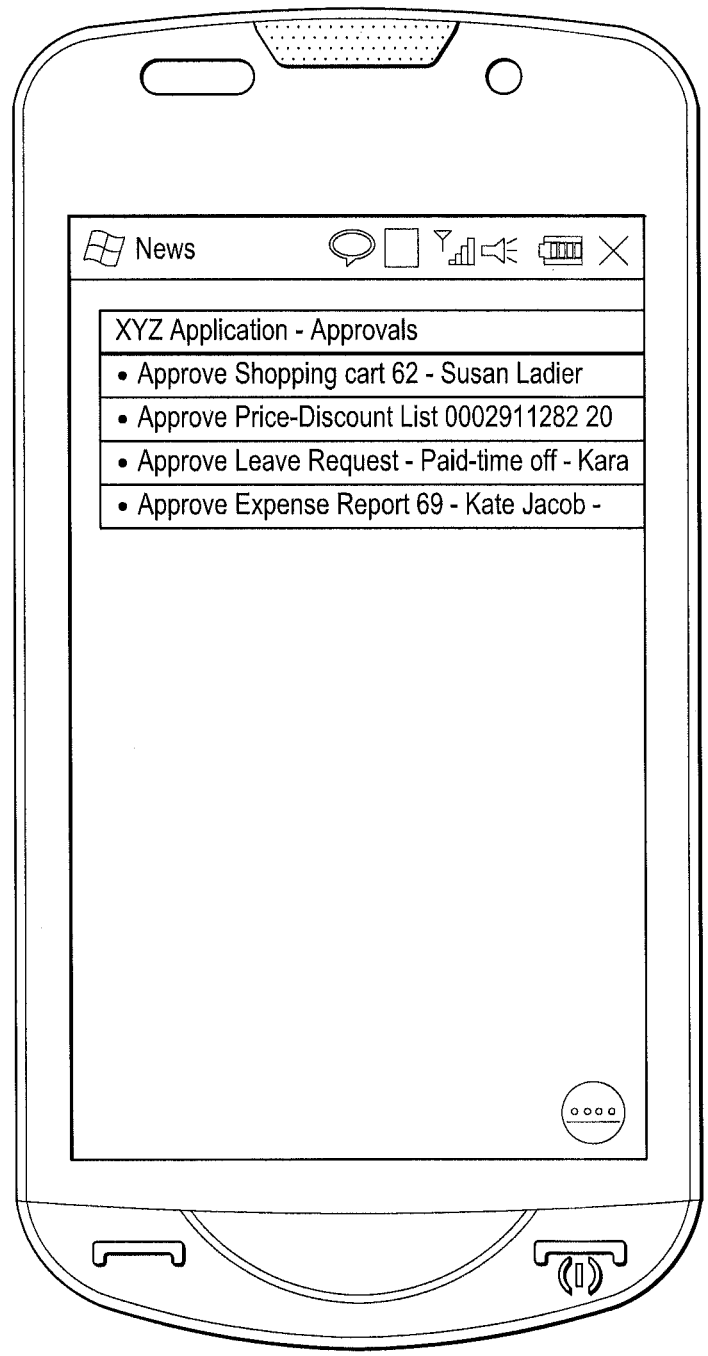

FIGS. 4C-E illustrate example implementations of received messages at a mobile device executing the Windows Mobile OS. In FIG. 4C, a text message is shown as being received at the device. In this instance, the message received is a standard message, and does not include a hyperlink or embedded reference to a particular mobile business application. Here, the message includes a task/notification description of "Approve leave request—Paid time off—Bob Jones," allowing the user of the mobile device to quickly understand the content and context of the notification. FIG. 4E illustrates the results of an intermediate application intercepting an incoming enhanced message (message not shown). The incoming enhanced message may include a hyperlink identifying a particular mobile business application associated with the content of the message. Based on the identification, the mobile device is able to provide the user with the option to launch the corresponding mobile business application. The user may be provided the option to launch the mobile business application or to access the information at a later time. FIG. 4F illustrates the retrieved state associated with a particular mobile business application. Here, the approval task associated with the received enhanced message is shown as the third item awaiting approval of the user of the mobile device. The user can interact with the approvals listed in the mobile business application to approve or reject the items listed.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method for providing a generic push notification to a mobile device, the method comprising:
    monitoring at least one business process for an occurrence of at least one triggering event;
    identifying, in response to the occurrence of the at least one triggering event, at least one parameter associated with the at least one triggering event;
    identifying at least one user associated with the at least one business process and the at least one triggering event;
    generating a message for the at least one identified user associated with the at least one triggering event, where the generated message includes a hyperlink that identifies a mobile business application that is associated with the at least one triggering event and that is to be invoked on the mobile device, and includes the at least one identified parameter associated with the at least one triggering event, the mobile device executing the mobile business application; and sending the generated message to the mobile device that is associated with the at least one identified user.

2. The method of claim 1, wherein the generated message comprises a Short Message Service (SMS) message.

3. The method of claim 1, wherein the at least one business process is associated with a remote business application.

4. The method of claim 1, wherein the at least one triggering event includes an event associated with the at least one monitored business process requiring input from the at least one user.

5. The method of claim 1, wherein the identified at least one parameter associated with the at least one triggering event includes an identification of a particular state of the at least one business process.

6. The method of claim 1, wherein the mobile device associated with the at least one identified user is determined based on information retrieved from a user database, and wherein sending the generated message to the mobile device associated with the at least one identified user includes sending the generated message to a mobile phone number associated with the at least one identified user.

7. The method of claim 6, further comprising:
determining a set of capabilities available on the mobile device; and
formatting the generated message based at least in part on the determined set of capabilities available on the mobile device.

8. The method of claim 1, wherein an activation of the hyperlink is operable to launch the identified mobile business application at the mobile device.

9. The method of claim 8, wherein the hyperlink included in the generated message further includes at least one of the at least one identified parameters.

10. The method of claim 9, wherein activation of the hyperlink is further operable to launch the identified mobile business application at the mobile device to a state specified by at least one of the parameters included in the generated message.

11. A computer-implemented method for receiving a generic push notification at a mobile device, the method comprising:
identifying a message received at the mobile device as being associated with a remote business application, where the message includes a hyperlink that is encoded with at least one parameter associated with a state of a mobile business application that is to be invoked on and executed by the mobile device;
launching the mobile business application at the mobile device in response to activation of the hyperlink, where the mobile business application is associated with the remote business application;
obtaining an updated state of the mobile business application based at least in part on the at least one parameter encoded with the hyperlink; and
presenting the mobile business application in the updated state at the mobile device.

12. The method of claim 11, wherein the message received at the mobile device is a Short Message Service (SMS) message.

13. The method of claim 12, wherein the SMS message is an enhanced message based on an enhanced messaging protocol, where the enhanced messaging protocol is defined at the mobile device and at a system executing the remote business application.

14. The method of claim 11, wherein the hyperlink is further encoded with a uniform resource locator identifying the mobile business application to be launched and executed on the mobile device.

15. The method of claim 12, wherein launching the mobile business application at the mobile device in response to activation of the hyperlink comprises:
launching a generic business application player in response to receiving the SMS message at the mobile device;
identifying the mobile business application associated with the SMS message; and
using the generic business application player to launch the identified mobile business application.

16. The method of claim 15, wherein launching the generic business application player in response to receiving the SMS message at the mobile device comprises:
monitoring incoming SMS messages received at the mobile device;
identifying the received SMS message as associated with the remote business application upon receipt at the mobile device; and
launching the generic business application player based on identifying the received SMS message as associated with the remote business application.

17. The method of claim 15, wherein identifying the mobile application associated with the SMS message comprises decoding the message to identify the associated mobile business application, where the SMS message is encoded with the hyperlink to a URL associated with the identified mobile business application, and wherein decoding the enhanced message is performed based at least in part on a predefined enhanced message protocol.

18. The method of claim 11, wherein obtaining the updated state of the mobile business application based at least in part on the at least one parameter encoded with the hyperlink includes:
sending a request for information associated with the at least one encoded parameter to the remote business application; and
receiving information defining the updated state of the mobile business application in response to the request at the mobile device.

19. A computer program product for providing a generic push notification to a mobile device, the computer program product comprising computer readable instructions embodied on tangible, non-transitory media, the instructions operable when executed to:
monitor at least one business process for an occurrence of at least one triggering event;
identify, in response to the occurrence of the at least one triggering event, at least one parameter associated with the at least one triggering event;
identify at least one user associated with the at least one business process and the at least one triggering event;
generate a message for the at least one identified user associated with the at least one triggering event, where the generated message includes a hyperlink that identifies a mobile business application that is associated with the at least one triggering event and that is to be invoked on the mobile device, and includes the at least one identified parameter associated with the at least one triggering event, the mobile device executing the mobile business application; and send the generated message to the mobile device that is associated with the at least one identified user.

20. A computer program product for receiving a generic push notification at a mobile device, the computer program product comprising computer readable instructions embodied on tangible, non-transitory media, the instructions operable when executed to:

identify a message received at the mobile device as being associated with a remote business application, where the message includes a hyperlink that is encoded with at least one parameter associated with a state of a mobile business application that is to be invoked on and executed by the mobile device;

launch a mobile business application at the mobile device in response to activation of the hyperlink, where the mobile business application is associated with the remote business application;

obtain an updated state of the mobile business application based at least in part on the at least one parameter encoded with the hyperlink; and present the mobile business application in the updated state at the mobile device.

\* \* \* \* \*